United States Patent [19]

Muehlenbernd et al.

[11] Patent Number: 4,956,414
[45] Date of Patent: Sep. 11, 1990

[54] PREPARATION OF IONICALLY CROSSLINKED ETHYLENE COPOLYMERS, IONICALLY CROSSLINKED ETHYLENE COPOLYMERS AND THEIR USE AS FILMS, CABLE SHEATHING AND ADHESION PROMOTERS

[75] Inventors: Thomas Muehlenbernd, Heidelberg; Norbert Hasenbein, Dirmstein, both of Fed. Rep. of Germany

[73] Assignee: BASF Aktiengesellschaft, Ludwigshafen, Fed. Rep. of Germany

[21] Appl. No.: 363,785

[22] Filed: Jun. 9, 1989

[30] Foreign Application Priority Data

Jun. 30, 1988 [DE] Fed. Rep. of Germany ........ 3822067

[51] Int. Cl.$^5$ ............................................ C08G 81/02
[52] U.S. Cl. .................................. 525/196; 525/201; 525/221
[58] Field of Search ..................... 525/196, 201, 221

[56] References Cited

U.S. PATENT DOCUMENTS 3,264,272  8/1966  Rees .
4,774,290  9/1988  Neill et al. .
4,847,164  7/1989  Neill et al. .

FOREIGN PATENT DOCUMENTS 0178643  4/1986  European Pat. Off. .

Primary Examiner—Bernard Lipman
Attorney, Agent, or Firm—Keil & Weinkauf

[57] ABSTRACT

Ionically crosslinked ethylene coolymers prepared by neutralizing the corresponding ethylene copolymers with the addition of an ionomer to a feed zone of an extruder of an ethylene high pressure polymerization system are used for film production, for cable sheathing and as adhesion promoters.

5 Claims, No Drawings

PREPARATION OF IONICALLY CROSSLINKED ETHYLENE COPOLYMERS, IONICALLY CROSSLINKED ETHYLENE COPOLYMERS AND THEIR USE AS FILMS, CABLE SHEATHING AND ADHESION PROMOTERS

The present invention relates to a process for the preparation of ionically crosslinked ethylene copolymers [A] by neutralizing the corresponding ethylene copolymers [B] which contain, as copolymerized units, from 0.1 to 20 mol % of $\alpha,\beta$-ethylenically unsaturated carboxylic acids or $\alpha,\beta$-ethylenically unsaturated comonomers which donate carboxyl groups, and ionically crosslinked ethylene copolymers obtained by the above process.

Processes of this type give ionically crosslinked ethylene copolymers, i.e. ionomers, which are particularly suitable for the production of films, cable sheathing and adhesion promoters and from which it is also possible to prepare products for the injection molding sector.

It is known that ionomers can be prepared by reacting ethylene/methacrylic acid copolymers with sodium methylate in a rubber mill (cf. U.S. Pat. No. 3,264,272). However, the process described is uneconomical since it is carried out by a batchwise procedure. A continuous process for the preparation of ionomers by copolymerization of ethylene with the metal salts of unsaturated carboxylic acids is described in EP No. A-223 182. However, the metal salts of the unsaturated carboxylic acids which are used there are very expensive to prepare (cf. Chem. Abstr. 87 (1977), 5403 q) and some of them are even impossible to prepare (cf. Am. Dyestuff Rep. 65 (7) [1976], 46–47 and Ind. Eng. Chem. 47 (11) (1955), 2258–2265). Moreover, the amounts of solvent required for metering the salts of the unsaturated carboxylic acids are so high that their regulating action interferes with the polymerization process. Furthermore, the solvent has to be removed from the product again by a relatively expensive procedure.

A two-stage process, as likewise described in EP No. A-223 182, is unsuccessful since the zinc oxide used behaves virtually like a filler. Films produced from these products are very inhomogeneous and have a high content of specks.

If a masterbatch containing zinc oxide, as described in EP No. A-223 182, is used for neutralizing the ethylene copolymer, ionic crosslinking does not take place. The product has a high content of specks. Ionic crosslinking is obtained only when zinc acetate . $2H_2O$ is used for neutralization. However, the product obtained still has many specks and has a strong smell of acetic acid. Aqueous solutions of zinc acetate cause corrosion in the extruder. The product thus obtained has a brown to black color.

A particularly elegant process for the preparation of ionomers having improved product homogeneity is described in EP No. A-193 110, where ethylene/acrylic acid copolymers are reacted with aqueous metal acetate solutions. However, the extruder must be protected against corrosion by the process described and must be equipped with two or more devolatilization vents. These preconditions are not fulfilled by extruders in high pressure polymerization plants. Moreover, they are as a rule shorter than the extruders designated as suitable in EP No. A-193 110.

It is an object of the present invention to provide a process for neutralizing ethylene/carboxylic acid copolymers, in which the neutralization is carried out in a conventional extruder of a high pressure polymerization system without corrosion problems occurring in the extruder. It is a further object of the present invention to provide an ionically crosslinked ethylene copolymer which leads to products having good film quality coupled with excellent transparency and toughness. It is a further object of the present invention to provide a completely odorless ionically crosslinked ethylene copolymer.

We have found that these objects are achieved by a process for the preparation of ionically crosslinked ethylene copolymers [A] by neutralizing the corresponding ethylene copolymers [B] which contain, as copolymerized units, from 0.1 to 20 mol % of $\alpha,\beta$-ethylenically unsaturated carboxylic acids or $\alpha,\beta$-ethylenically unsaturated comonomers which donate carboxyl groups, with the addition of a metal salt to a feed zone of an extruder, wherein the neutralization is carried out in the absence of a solvent in an extruder of an ethylene high pressure polymerization system, and the metal salt added is an ionomer [C].

The temperature in the extruder during the neutralization is preferably above the melting points of the copolymers [A], [B] and [C].

The ionomer [C] is preferably added in amounts of from 2 to 30% by weight, based on the amount of the ethylene copolymer [B].

In another preferred process, the ionomer [C] is prepared from an ethylene/carboxylic acid or ethylene/carboxylic anhydride copolymer, graft copolymer or terpolymer [D] and an aqueous metal acetate solution.

We have found furthermore that these objects are achieved by ionically crosslinked ethylene copolymers [A] obtained by a process described above.

Suitable ethylene copolymers [B] are copolymers of ethylene which contain 0.1-20 mol %, based on the copolymer, of $\alpha,\beta$-ethylenically unsaturated carboxylic acids or $\alpha,\beta$-ethylenically unsaturated comonomers which donate carboxyl groups. For the purposes of the present invention, $\alpha,\beta$-ethylenically unsaturated carboxylic acids are the conventional carboxylic acids which are copolymerizable with ethylene, such as acrylic acid, methacrylic acid, itaconic acid, maleic acid or fumaric acid. Examples of $\alpha,\beta$-ethylenically unsaturated comonomers which donate carboxyl groups are methyl hydrogen maleate, maleic anhydride, tert-butyl acrylate, etc., i.e. comonomers which are converted into carboxyl-containing comonomers during or after the polymerization by hydrolysis and/or pyrolysis. The ethylene copolymers may contain in copolymerized form, in addition to the $\alpha,\beta$-ethylenically unsaturated carboxylic acids or comonomers donating carboxyl groups, other comonomers which are copolymerizable with ethylene (cf. EP No. A1-106999). Esters of (meth)acrylic acid, mono- and diesters of maleic acid and fumaric acid, amides of monoethylenically unsaturated carboxylic acids, in particular (meth)acrylamide and N-mono- and N,N-dialkylamides of (meth)acrylic acid are particularly suitable. The ethylene copolymers [B] are known per se and are described in, for example GB No. A-2 091 745, U.S. Pat. Nos. 3,520,861, 3,264,272, GB No. -A-1 011 981, U.S. Pat. Nos. 3,404,134 or 3,969,434. The corresponding graft copolymers are also suitable ethylene copolymers [B]. The melt flow indices of the ethylene copolymers [B] are in general 0.1-500 g/10', measured at 190° C. and 2.16 kp (according to DIN 53 735). Products having a melt flow index of 1-80 g/10' are preferred. Melting points of the ethylene copolymers are from 70° to 115° C.

The ionically crosslinked ethylene copolymers, also referred to as ionomers, are usually prepared by reacting ethylene copolymers [B] with aqueous metal acetate solutions. The ethylene copolymers [D] may be identical to the ethylene copolymers [C], but ethylene copolymers having a higher acid content than that of the class of substances [C] are preferred. The reaction of the aqueous metal acetate solutions is carried out in a corrosion-resistant twin-screw extruder, for example ZSK 57 from Werner & Pfleiderer. Methods and suitable steels are described in EP No. A-193 110.

Completely odorless and speck-free products are obtained only by an expensive three-stage devolatilization procedure under reduced pressure. The three devolatilization zones are separated from one another by retarding elements. The reduced pressures are 800 mbar, 100 mbar and 10 mbar. Preferably 10–90, very particularly preferably 30–80, mol % of the carboxyl groups are neutralized.

Ionically crosslinked ethylene copolymers which are obtained by adding a metal salt to a feed zone of an extruder are sufficiently well known for further explanations to be unnecessary (cf. for example U.S. Pat. No. 3,006,029).

In the novel process for the preparation of an ionically crosslinked ethylene copolymer [A], neutralization of the ethylene copolymer [B] is carried out in the absence of a solvent in an extruder of an ethylene high pressure polymerization system, and an ionomer [B] is added as the metal salt. In preferred processes, the temperature in the extruder during neutralization should be above the melting points of the ethylene copolymers [A], [B] and [C]; the ionomer should be added in amounts of from 2 to 30% by weight, based on the amount of the ethylene copolymer [B], or the ionomer [C] should be prepared from an ethylene/carboxylic acid or ethylene/carboxylic anhydride copolymer, graft copolymer or terpolymer and an aqueous metal acetate solution.

Neutralization is understood as 5–100% conversion of the acid groups of the ethylene copolymer [B] into the corresponding salt groups to give the ionically crosslinked ethylene copolymer [A]. In this conversion, the ionomer [C] may be introduced into a feed zone of the extruder in the form of granules or of a melt, and it is not necessary for a solvent to be present, in contrast to many prior art processes, where a solvent is usually present. The ethylene high pressure polymerization plant extruder used is of the customary type for this purpose which does not incorporate any special corrosion protection measures are employed as the extruder of an ethylene high pressure polymerization plant. Such extruders are generally known and are described in, for example, D. Anders, Kunststoffe 65 (7) (1975), 396–400. A ZSK 120 production extruder from Werner & Pfleiderer is preferably used. The feed zone preferably used is a second feed zone of the extruder, the ethylene copolymer [B] being metered into the first feed zone.

The temperature in the mixing zone of the extruder during the neutralization is preferably above the melting point of the ethylene copolymers [A] and [C]. In general, a temperature range of from 140° to 320° C. is maintained.

The ionomer [C] is added to the extruder in amounts of from 2 to 30, in particular from 5 to 10, % by weight, based on the amount of the ethylene copolymer [B].

The ionomer [C] is prepared from a conventional ethylene/carboxylic acid or ethylene/carboxylic anhydride copolymer, graft copolymer or terpolymer [D] by reaction with an aqueous metal acetate solution (cf. for example EP-A-193 100). However, other conventional processes are also suitable for the preparation of the ionomer [C] (cf. for example EP-A-199 011). The ionomer [C] is preferably highly neutralized and consists of a carboxyl-containing ethylene copolymer which contains 99 mol % of completely neutralized carboxyl groups.

An advantage of the novel process is that the neutralization to give the ionically crosslinked ethylene copolymer [A] can be carried out in extruders of high pressure polymerization plants, there being no need for the extruders to be protected against corrosion by expensive methods.

Another advantage of the invention is that the product obtained can be used to produce speck-free films having excellent strength properties and transparency, good adhesion promoters for polar substrates, such as metals, polyamide, glass, partially hydrolyzed ethylene/vinyl acetate copolymers, etc., materials for cable sheathing and products for the injection molding sector. It is also advantageous that the ionically crosslinked ethylene polymers obtained are completely odorless and that there are no corrosion problems in the extruder.

EXAMPLE 1

Preparation of the ionomer [B]

50 kg/hour of BASF Lucalen A 3510 MX (an ethylene/acrylic acid copolymer containing 6.5% by weight of copolymerized acrylic acid) were neutralized with 20 kg of a 20% strength by weight aqueous zinc acetate solution at 220° C. in a corrosion-resistant ZSK 57 twin-screw extruder from Werner & Pfleiderer. The extruder was equipped with three devolatilization vents, at which the pressure was reduced to 800, 100 and 10 mbar. Air was prevented from entering the feed of the extruder by means of nitrogen passed countercurrent.

The granules obtained after compounding had high transparency, a zinc content of 2.5% by weight and a degree of neutralization of 80 mol %. The product was completely odorless and gave a good film quality, free of specks.

EXAMPLE 2

32 kg/hour of the highly neutralized ionomer prepared according to Example 1 were introduced into the second solid feed of a ZSK 120 production extruder and reacted at 220° C, with 550 kg of a terpolymer containing 1% by weight of acrylic acid and 2% by weight of n-butyl acrylate. The product obtained had high mechanical strength. The zinc content was determined as 0.13% by weight, giving a degree of neutralization of 27%. Measurements of the dart drop showed an increase from 160 to 480.

COMPARATIVE EXAMPLE 1

35 kg of a prepared masterbatch of 100 kg of Lucalen A 3510 MX (ethylene copolymer containing 6.5% by weight of copolymerized acrylic acid) and 2.9 kg of zinc oxide were introduced, per hour, into the second solid feed of a ZSK 120 production extruder and reacted with 600 kg of an ethylene/n-butyl acrylate/acrylic acid terpolymer (2% by weight of n-butyl acrylate and 1% by weight of acrylic acid). The non-occurrence of any decrease in the MFI indicated that ionic crosslinking had not taken place. The dart drop decreased compared with the starting material and the films had many specks and speck chains.

COMPARATIVE EXAMPLE 2

13 kg of a 20% strength by weight zinc acetate solution were added per hour to 600 kg of an ethylene/acrylic acid/n-butyl acrylate terpolymer (2% by weight of n-butyl acrylate and 1% by weight of acrylic acid) in a reduced-pressure zone of the ZSK 120 extruder and were reacted. When metering of zinc acetate was switched off, the previously colorless granules assumed a deep brown coloration. Measurements of the iron content (2,500 ppm) confirmed the occurrence of corrosion of the extruder material. The experiment was therefore immediately terminated.

We claim:

1. A process for the preparation of an ionically crosslinked ethylene copolymer [A] by neutralizing the corresponding ethylene copolymer [B] which contains, as copolymerized units, from 0.1 to 20 mol % of $\alpha,\beta$-ethylenically unsaturated carboxylic acids or $\alpha,\beta$-ethylenically unsaturated comonomers which donate carboxyl groups, with the addition of a metal salt to a feed zone of an extruder, wherein the neutralization is carried out in the absence of a solvent in an extruder of an ethylene high pressure polymerization system, and the metal salt added is a metal salt of carboxyl-containing ethylene copolymer, ethylene graft copolymer or ethylene terpolymer [C].

2. A process as defined in claim 1, wherein the temperature in the extruder during the neutralization is above the melting points of the copolymers [A], [B] and [C].

3. A process as defined in claim 1, wherein the a metal salt of carboxyl-containing ethylene copolymer, ethylene graft copolymer or ethylene terpolymer [C] is added in amounts of from 2 to 30% by weight, based on the amount of the ethylene copolymer [B].

4. A process as defined in claim 1, wherein the [C] is prepared from an ethylene/carboxylic acid or ethylene/carboxylic anhydride copolymer, graft copolymer or terpolymer [D] and an aqueous metal acetate solution.

5. An ionically crosslinked ethylene copolymer [A] obtained by the process defined in claim 1.

* * * * *

UNITED STATES PATENT AND TRADEMARK OFFICE
CERTIFICATE OF CORRECTION

PATENT NO. : 4,956,414

DATED : September 11, 1990

INVENTOR(S) : Thomas MUEHLENBERND et al.

It is certified that error appears in the above-identified patent and that said Letters Patent is hereby corrected as shown below:

<u>Claim 3, column 6, line 13</u>, "the a" should read --the--.

<u>Claim 4, column 6, line 18</u>

"wherein the [C]" should read:

--wherein the metal salt of carboxyl-containing ethylene copolymer, ethylene graft copolymer or ethylene terpolymer--

Signed and Sealed this

Seventh Day of July, 1992

Attest:

DOUGLAS B. COMER

Attesting Officer

Acting Commissioner of Patents and Trademarks